United States Patent Office 2,713,589
Patented July 19, 1955

2,713,589

CADMIUM DILAURYL DIMERCAPTIDE

Milton R. Radcliffe, Hackensack, N. J., assignor to The Firestone Tire & Rubber Company, Akron, Ohio, a corporation of Ohio No Drawing. Application January 5, 1952,
Serial No. 265,203

1 Claim. (Cl. 260—429)

The object of this invention is cadmium dilauryl dimercaptide.

Cadmium diethyl dimercaptide is briefly described in the early chemical literature, see J. Pr. [2] 15:205 (1877). No practical utility has been found for this or any closely related compound during the intervening three-quarters of a century. The cadmium dilauryl dimercaptide of this invention, however, has excellent heat- and light-stabilizing action in vinyl chloride resins, and exerts a beneficial adjuvant effect in diene polymerization reactions.

PREPARATION OF THE MERCAPTIDES

The cadmium higher dialkyl mercaptides of this invention may be prepared by means of a variety of double-decomposition reactions, such as the following:

1. Reaction of a cadmium dihalide with a sodium or other alkali metal mercaptide containing the alkyl radicals desired in the final cadmium mercaptide product, as indicated by the equation:

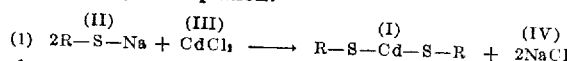

the notation being as given above for Formula I. The reaction takes place at ordinary temperatures upon mixing together of the reactant, preferably dissolved in a medium which is a solvent for one or both of the starting materials but not for the cadmium mercaptide. Desirable reaction media include lower alcohols such as methanol, ethanol, propanol and mixtures of these with up to about equal parts of water; ketones such as acetone and methyl ethyl ketone; and mixtures of these with each other and similar solvents. The cadmium mercaptide product is usually insoluble in the medium, and may be separated from the reaction mixture by filtration. The salt (IV) produced may be removed from the product by washing with water.

2. Reaction of a mercaptan containing the alkyl groups desired in the mercaptide product with a cadmium salt of a weak acid such as cadmium acetate, according to the equation:

the radical R being as defined above. The reaction may be carried out in the same solvents as are employed for Reaction 1 above, and will proceed at room temperature. The product mercaptide will ordinarily be insoluble in the reaction medium, and may be isolated by filtration. Any acid (VII) entrained by the product may be removed by washing with water.

3. Reaction of an appropriate mercaptan with cadmium oxide or hydroxide, according to the equation:

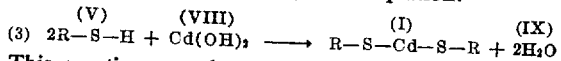

This reaction may be carried out by mixing and heating the reactants together at temperatures from 40° C. to 180° C. In most cases, the mercaptan (V) will not be volatile under these conditions, and the reaction may be carried out in open vessels; however if the mercaptan employed is volatile at the temperature selected, the reaction may be carried out in closed vessels with provision for reflux and, if necessary to confine the reactants, maintenance of superatmospheric pressure.

THE CADMIUM MERCAPTIDE PRODUCTS

As above noted, the compounds of this invention have the formula:

(I)                      R—S—Cd—S—R wherein R, independently in each occurrence, represents an alkyl radical containing from 5 to 20 carbon atoms, the rest of the formula following conventional chemical notation. Following are examples of radicals falling within the ambit of the symbol R:

| | |
|---|---|
| n-Amyl | n-Decyl |
| Isoamyl | n-Dodecyl |
| n-Hexyl | n-Tetradecyl |
| n-Octyl | n-Hexadecyl |
| 2-ethyl hexyl | n-Octadecyl |
| n-Nonyl | n-Eicosyl |
| 3,5,5-trimethyl hexyl | |

The two radicals R in any given molecule need not be identical, e. g. one radical may be a nonyl radical and the other a dodecyl radical. Likewise, not all the molecules in a given preparation need be identical; it will suffice if the molecules individually come within the ambit of Formula I. This will unavoidably be the case where source materials for the alkyl radicals (alkali mercaptides in the case of Reaction 1 or mercaptans in the cases of Reactions 2 and 3) are mixtures of compounds containing suitable alkyl radicals. Examples of suitable industrial mixed mercaptans (suitable alkali mercaptides can be prepared from these) include:

Table I

Mixed mercaptans produced by the conversion, to mercaptans, of the alcohols produced by reduction of the fatty acid radicals of coconut oil or other natural fatty oils.

Mercaptans produced by conversion to mercaptans of the alcohols produced by the "oxo" process, i. e. hydrogenation of a mixture of carbon monoxide and petroleum olefines.

"Kerosene mercaptans" produced by conversion to mercaptans of the alkyl chlorides produced by chlorinating petroleum fractions.

Mercaptans produced by reduction of sulfonic acids produced by the photocatalysed chlorosulfonation of hydrocarbons.

The compounds of this invention are pulverulent materials, usually white or light in color. They are compatible with vinyl chloride resins such as polyvinyl chloride and copolymers thereof with minor proportions of vinyl acetate, vinylidene chloride etc. Compositions of such vinyl chloride resins containing, say 1%, based on the resin, of the higher alkyl cadmium mercaptides of this invention, have extraordinary resistance to heat and mechanical working, being capable of prolonged exposure to commercial calendering operations at high speeds and at temperatures substantially in excess of 320° F.

With the foregoing general discussion in mind, there are given herewith detailed examples of the practice of this invention.

EXAMPLE I.—CADMIUM AMYL MERCAPTIDE (a)

| | |
|---|---|
| Amyl mercaptan | 35.4 g. (.34 mole). |
| Methanol | 200 ml. |

(b)

| | |
|---|---|
| Cadmium acetate dihydrate | 91.5 g. (.34 mole). |
| Water | 200 ml. |

Separate solutions were made up from the ingredients listed at (a) and from the ingredients listed at (b). The solution of ingredients (b) was added slowly to the solution of ingredients (a), the latter being vigorously stirred throughout the addition. The precipitated cadmium diamyl mercaptide was separated from the liquid by filtration, washed on the filter with water, and dried. The product was a white powder.

EXAMPLE II.—CADMIUM OCTYL MERCAPTIDE (a)

| | |
|---|---|
| n-Octyl mercaptan | 50 g. (.34 mole). |
| Methanol | 200 ml. |

(b)

| | |
|---|---|
| Cadmium acetate dihydrate | 91.5 g. (.34 mole). |
| Water | 200 ml. |

Separate solutions were made up from the ingredients listed at (a) and from the ingredients listed at (b). The solution of ingredients (b) was added slowly to the solution of ingredients (a), the latter being vigorously agitated throughout the addition. Cadmium octyl mercaptide was precipitated, separated by filtration, and washed on the filter with a mixture of four parts of methanol to one part of water until the washings were neutral. There were obtained 76 grams (60% of theory) of cadmium dioctyl dimercaptide. The product was a white powder showing by analysis 15.50% sulfur, theory 15.92%.

EXAMPLE III.—CADMIUM DECYL MERCAPTIDE (a)

| | |
|---|---|
| n-Decyl mercaptan | 50 g. (.29 mole). |
| Methanol | 200 ml. |

(b)

| | |
|---|---|
| Sodium hydroxide | 9.9 g. (.25 mole). |
| Methanol (90%) (90% methanol, 10% water by weight) | 100 ml. |

(c)

| | |
|---|---|
| Cadmium chloride dihydrate | 56.5 g. (.25 mole). |
| Water | 100 ml. |

Separate solutions were made up from the ingredients listed at (a), at (b) and at (c). The solution of ingredients (b) was added to the solution of ingredients (a) and the solutions thoroughly mixed. The solution of ingredients (c) was then gradually added to the combined solution of ingredients (a) and (b), with vigorous stirring of the combined solution. The precipitated cadmium di(n-decyl) dimercaptide was separated from the solution by filtration, and washed on the filter with a mixture of 4 parts by weight of methanol and one part by weight of water until the washings were free of chloride ion. The product was a white powder, and analysis showed 11.22% sulfur (theory, 12.4%).

EXAMPLE IV.—CADMIUM CYCLOHEXYLCYCLOHEXYL MERCAPTIDE (a)

| | |
|---|---|
| p-Cyclohexylcyclohexyl mercaptan | 4.7 g. (.024 mole). |
| Acetone | 25 ml. |

(b)

| | |
|---|---|
| Cadmium acetate dihydrate | 8.0 g. (.03 mole). |
| Methanol | 200 ml. |

Separate solutions were made up from the ingredients listed at (a) and at (b). The solution of ingredients (b) with (a) was added to the solution of ingredients (b) with vigorous stirring. The resultant slurry was warmed to 50° C., and the precipitate (cadmium p-cyclohexylcyclohexyl mercaptide) separated by filtration. The precipitate was re-slurried with water at 50° C., refiltered, washed on the filter with acetone, and dried. The cadmium di(p-cyclohexylcyclohexyl) dimercaptide product, amounting to 3.5 g., was a white powder showing on analysis 11.69% sulfur (calculated 12.64).

EXAMPLE V.—CADMIUM LAURYL, TETRADECYL AND OCTADECYL MERCAPTIDES (a)

| | |
|---|---|
| Lauryl, n-tetradecyl or n-octadecyl mercaptan | .09 gram-mole. |
| Methanol | 200 ml. |
| Aqueous sodium hydroxide solution (containing 50%, by weight, of sodium hydroxide) | 7.2 g. (.09 mole). |

(b)

| | |
|---|---|
| Cadmium chloride dihydrate | 10 g. (.045 mole). |
| Water | 10 ml. |
| Methanol | 25 ml. |

The lauryl, tetradecyl and octadecyl mercaptans were used in three separate preparations of mercaptides. In the case of each preparation, a solution was made up from the selected mercaptan and the other ingredients listed at (a), forming a solution of the sodium mercaptide of the mercaptan used. A solution was made up from the ingredients listed at (b) and added with vigorous agitation to the sodium mercaptide solution. The cadmium dimercaptide so precipitated was separated by filtration, re-slurried with water, re-filtered, re-slurried with acetone, re-filtered and dried.

All of the mercaptide products were fine white powders. Samples of the products were assayed by treating with concentrated hydrochloric acid and iodimetric titration of the liberated mercaptan. The results are set forth herewith.

*Table II*

| Mercaptide | Percentage Sulfhydryl Group (—SH) | |
|---|---|---|
| | Calculated | Found Iodimetrically |
| Lauryl | 12.8 | 11.6 |
| Tetradecyl | 11.6 | 9.35 |
| Octadecyl | 9.69 | 8.41 |

EXAMPLE VI.—LARGE SCALE PREPARATION OF CADMIUM LAURYL MERCAPTIDE

| | Pounds |
|---|---|
| Commercial lauryl mercaptan (containing the mixed fatty radicals obtained by hydrogenating coconut oil fatty acids; largely lauryl and myristyl mercaptans) | 66 |
| 95% methanol (95% methanol, 5% water by weight) | 240 |
| Aqueous sodium hydroxide solution (containing 50% sodium hydroxide by weight) | 24 |
| Aqueous cadmium chloride solution (containing 48% of cadmium chloride) | 60 |

A 50-gallon glass-lined reactor provided with a rotary anchor-type stirrer was provided for this preparation. The lauryl mercaptan and methanol were charged into the reactor, and agitation commenced and continued until interrupted as indicated below. The sodium hydroxide solution was added over a three-minute period, causing the temperature to rise to 95° F. Next the cadmium chloride solution was added gradually over a period of 40 minutes. Cadmium dimercaptides of the mixed mercaptans contained in the commercial lauryl mercaptan were precipitated, and removed by filtration.

The mercaptides were re-slurried with 60 gallons of water containing 0.011% of sodium dioctyl sulfosuccinate (Aerosol OT, a product of the American Cyanamid and Chemical Co.) and again filtered. The filter cake was dried in a forced circulation tray drier at 150° F. for 24 hours. Analysis of the product indicates the presence of 1% of chloride ion and 5% acetone extractable material. The yield was 80 pounds, or 99% based on the cadmium chloride.

EXAMPLE VII.—STABILIZATION TESTS a. Formulation

| | Parts |
|---|---|
| Vinyl chloride resin (copolymer of 90% vinyl chloride, 10% vinylidene chloride by weight) | 81 |
| Cadmium dialkyl mercaptide (per Table IV) | 1.0 |
| Dicetyl ether | 2.5 |
| Dioctyl phthalate | 15.5 |

A series of compositions was made up in accordance with the foregoing schedule, using in the several compositions the several dialkyl mercaptides prepared as described in the preceding examples. The mercaptides used in the compositions made are set forth hereinbelow in Table IV, together with the results of tests conducted thereon.

b. Calender endurance tests

Each composition was worked on a calender maintained at 320° F. All of the compositions withstood over 100 minutes of this treatment.

c. Film tests

In addition to the calender endurance test above described, the compositions were worked for 15 minutes on a calender at 320° F., to simulate rather severe manufacturing conditions, and then calendered on the same calender at 320° F. into films .002" thick. Properties of the films were determined as follows:

The moisture transmission coefficient of each film was determined in accordance with the General Foods moisture transmission test.

The color of each film was rated by the operator. The rating was "excellent" in all cases.

The transparency of each film was determined by superposing layers of the film over a .01" india ink line drawn on hot-press Bristol board; the total thickness of film, in mils, required to render the line indistinguishable, was taken as a measure of the transparency of the film.

The tensile strength and elongation at break of each film was likewise determined on a Scott tester.

The properties of each film are set forth in Table I opposite the composition thereof. From inspection it will be seen that the stabilizers of this invention all retained intact the tensile properties of the film.

Table III.—Calender and film tests

| Cadmium Mercaptide Used | | Properties of Film Made After 15 Minutes on Calender at 320° F. | | | |
|---|---|---|---|---|---|
| Alkyl Radical | Prepared by Example No. | Moisture Transmission Coefficient | Clarity (Mils) | Tensile Strength (pounds per square inch) | Elongation (per cent) |
| Amyl | I | 3.5 | 72 | 4,000 | 250 |
| n-Octyl | II | 3.0 | 70 | 4,000 | 300 |
| Coconut | VI | 3.4 | 75 | 4,200 | 250 |
| n-Octadecyl | V | 3.0 | 75 | 4,500 | 260 |

From the foregoing general discussion and detailed specific examples, it will be evident that this invention provides a novel class of cadmium dialkyl dimercaptides having great technical utility, notably for the stabilization of vinyl chloride resins, and for the regulation of polymerization reactions. The cadmium compounds and higher alkyl mercaptans required as starting materials for the production of the cadmium mercaptides of this invention are all readily available, and the synthetic procedures are simple and give good yields.

This application is a continuation-in-part of the applicant's earlier application Radcliffe Serial No. 780,581, filed October 17, 1947 (now the patent to Radcliffe 2,581,915), which latter application was in turn a continuation-in-part of, and copending with, his still earlier application Radcliffe, Serial No. 547,634, filed August 1, 1944 (now abandoned). The earliest filed of these applications, Radcliffe, Serial No. 547,634, disclosed on page 15, the table, items Nos. 13–16, the cadmium lauryl mercaptide set forth in the present application. The intermediate application Radcliffe, Serial No. 780,581, likewise disclosed this compound on page 11, Table I, the 5th to 9th items, and page 4, line 4 (in the patent these items occur in column 2, line 36 and in the table following column 5, line 48).

What is claimed is:

Cadmium dilauryl dimercaptide.

References Cited in the file of this patent

UNITED STATES PATENTS

| 2,310,449 | Lightbrown et al. | Feb. 9, 1943 |
| 2,581,493 | Lyon et al. | Jan. 8, 1952 |
| 2,581,908 | Kinziger | Jan. 8, 1952 |
| 2,581,915 | Radcliffe | Jan. 8, 1952 |

FOREIGN PATENTS

| 542,141 | Great Britain | Dec. 29, 1941 |
| 647,970 | Great Britain | Dec. 28, 1950 |

OTHER REFERENCES

Claesson: J. Pr. (2) 15:205 (1877).

British Plastics, vol. 25, Issue 255, pages 70–72, August 1950.

UNITED STATES PATENT OFFICE
CERTIFICATE OF CORRECTION

Patent No. 2,713,589                                                        July 19, 1955

Milton R. Radcliffe

It is hereby certified that error appears in the printed specification of the above numbered patent requiring correction and that the said Letters Patent should read as corrected below.

Column 1, line 39, for "reactant" read -- reactants --; column 5, lines 17 and 25, for "Table IV", each occurrence, read -- Table III --; line 54, for "Table I" read -- Table III --; column 6, line 45, list of references cited, under "UNITED STATES PATENTS", for "Lightbrown et al" read -- Lightbown et al --.

Signed and sealed this 22nd day of October 1957.

(SEAL)
Attest:

KARL H. AXLINE
Attesting Officer

ROBERT C. WATSON
                                                                                                                      Commissioner of Patents